May 1, 1923.   1,453,426
S. T. WILLIAMS
FAIRLEAD OR GUIDE FOR THE CONTROL CABLES OF AIRCRAFT
Original Filed Nov. 15, 1920
FIG. I.
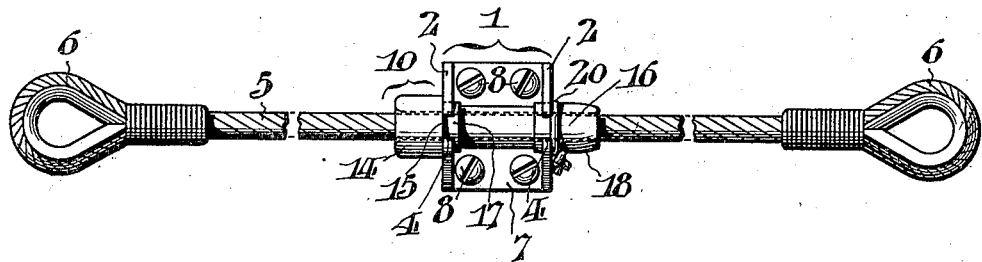
FIG. II.
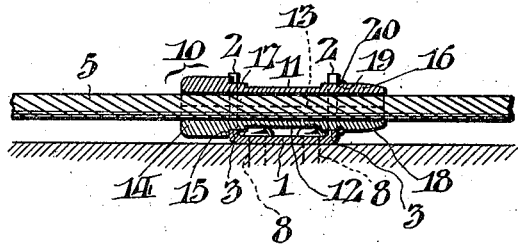
FIG. III.
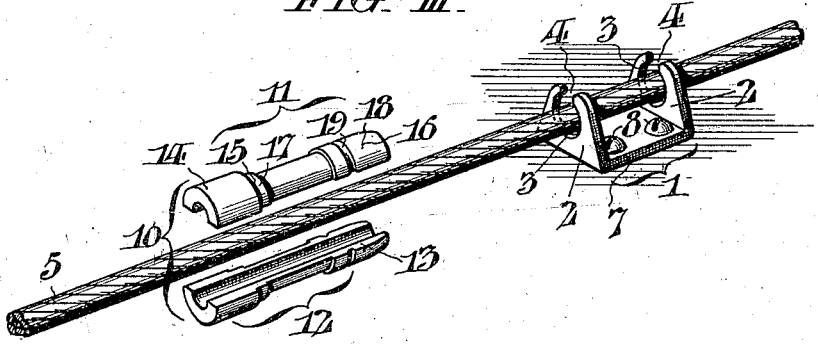
WITNESSES:
John E. Bergner
James H. Bell
INVENTOR:
Seldon T. Williams,
BY
ATTORNEYS.

Patented May 1, 1923.

1,453,426

UNITED STATES PATENT OFFICE.

SELDON T. WILLIAMS, OF PHILADELPHIA, PENNSYLVANIA, ASSIGNOR TO WESTINGHOUSE ELECTRIC & MANUFACTURING COMPANY, A CORPORATION OF PENNSYLVANIA.

FAIRLEAD OR GUIDE FOR THE CONTROL CABLES OF AIRCRAFT.

Application filed November 15, 1920, Serial No. 424,091. Renewed October 8, 1921. Serial No. 506,490.

*To all whom it may concern:*

Be it known that I, SELDON T. WILLIAMS, a citizen of the United States, residing at Philadelphia, in the county of Philadelphia and State of Pennsylvania, have invented certain new and useful Improvements in Fairleads or Guides for the Control Cables of Aircraft, whereof the following is a specification, reference being had to the accompanying drawings.

The invention relates to fairleads useful in connection with air craft construction for the purpose of guiding the motion of flexible cables, for example, those employed in connecting the operating levers by which the actuation of the rudders, elevators, or other controlled appurtenances of the air craft is effected.

Heretofore, it has been customary to make up control cables of the type above referred to, formed only at one end with a terminal eye, while the other end was left open so that the cable could be threaded through the fairleads. As a consequence, the other terminal eye could not be closed or formed until after the mounting of the cable on the air craft. This not only involved a considerable loss of time in initial assembling, but made it correspondingly as costly to assemble or disassemble air craft for shipment or when removal of any of the parts became necessary for replacement.

The object of my invention is to overcome these difficulties, and it is my chief aim to make it possible to readily mount and dismount control cables for air craft which are initially made up complete with terminal eyes at both ends. To this end, I have devised a fairlead or cable guide comprising a holder element which may be permanently secured to the air craft during construction, and a split guide sleeve element capable of being readily removed from the holder element and taken apart to permit the mounting and dismounting of the cables without the necessity for any threading as above referred to.

Other advantages of my invention will become apparent from the detailed description which follows.

In the accompanying drawings, Fig. I is an illustration showing my improved fairlead or cable guide in association with a control cable of an air craft.

Fig. II is a longitudinal sectional view of the structure; and

Fig. III is an illustration in perspective suggesting the method of assembling the device in practice.

As herein represented, the structure comprises a holder element in the form of a sheet metal stamping 1 bent, as shown in Fig. II, in the form of the letter U. The upstanding ends 2—2 of the element 1 have apertures 3—3, which, in order to permit the insertion of the flexible cable, conventionally represented at 5, (as will be later explained) are accessible through the longitudinally aligned notches or interruptions 4—4. In the course of its formation, the base 7 of the holder element 1 is suitably punched or pierced for the accommodation of screws 8, or equivalent means, by which attachment to the body or other portion of the air craft may be effected.

The holder 1 serves as a mounting for a guide element in the form of a split sleeve comprehensively indicated by the numeral 10, which has, as clearly shown, a general cylindrical configuration. From Fig. III, it will be seeen that this guide sleeve consists of two sections or halves 11 and 12, which are identical counterparts of one another, and which when assembled, meet along a longitudinal plane designated at 13. At one extremity, the sleeve has an enlargement or head 14, which affords a stop shoulder 15, while the opposite extremity 16 of the sleeve, together with a relatively narrow band 17 directly behind the shoulder 15 is turned to a diameter corresponding to that of the apertures 3—3 in the upstanding ends of the holder element 1. The extremity 16 of the sleeve is tapered as at 18, and also peripherally grooved as at 19, for reasons which will presently become apparent. The intermediate section of the sleeve is preferably still further relatively reduced in diameter as shown. In practice, the sleeve is preferably made of a non-corrosive, slow wearing substance capable of being impregnated with a suitable lubricant, or of a compound possessing inherent lubricative qualities.

In the application of the fairlead to practical use, the holder element 1 is first permanently secured by means of the screws 8. as previously suggested, at the desired location upon the air craft during construction of the latter, and the operating cable 5 next inserted through the aligned interruptions or notches 4—4 in the upturned ends 2—2 of the element 1 until properly disposed within the apertures 3—3. The counterpart sections 11 and 12 of the sleeve 10 are then relatively and complementarily superposed, and at the same time, so placed as to embrace the cable. The sleeve assemblage is then slipped along the cable and its tapered extremity 16 inserted first through the one, and then the other of the apertures 3—3 of the holder element 1 until the stop shoulder 15 of the enlargement 14 engages the outer face of the corresponding end of the holder. When the sleeve 10 has been thus placed, it will be noted that the peripheral groove 19 occupies a position immediately adjacent the outer face of the opposite upstanding end 2 of the element 1, so that a ring clip or wire band 20 (whose ends are subsequently twisted together), when seated within the groove, will serve by cooperation with the shoulder 15 in securing the sleeve against displacement in the holder element.

It will thus be apparent that the holder elements of fairleads constructed according to my invention, may be initially permanently secured at the desired points during the construction of the air craft, and the cables 5 previously completely made up with terminal eyes at both ends as represented at 6 in Fig. I of the drawings, readily mounted and with like facility removed when replacement becomes necessary through wear of any of the associated parts, or for any other reason.

While I have shown and described my invention as being particularly adapted for the special use hereinbefore pointed out, it will be obvious that the same may, with equal advantages, be used for other purposes such, for example as hangers or mountings for electric wiring in which case the sleeves would be made of a suitable insulating substance or material.

Having thus described my invention, I claim:

1. In a device of the character described, the combination with an apertured holder element, of a longitudinally split guide sleeve element adapted to be received within the aperture of the holder element and positioned with its extremities protruding beyond the end of said holder element; together with means at the ends thereof for securing the sleeve against longitudinal displacement within the holder.

2. In a device of the character described, the combination with an apertured holder element, of a longitudinally split guide sleeve element adapted to be inserted within the aperture of the holder, said sleeve element having at one extremity a shoulder which by engagement with one end of the holder serves to determine the relative positions of the two elements in assemblage; together with means attachable to the opposite protruding extremity of the sleeve element for engaging the corresponding end of the holder element and functional in cooperation with the aforesaid shoulder in securing the sleeve element against longitudinal displacement within the holder element.

3. In a device of the character described, the combination with an apertured holder, of a longitudinally split guide sleeve adapted to be inserted within the aperture of the holder, said sleeve having at one extremity a stop shoulder adapted to engage with the corresponding end of the holder and provided on the protruding portion of its opposite extremity with a peripheral groove functional as a seat for retaining an annular band, which by engaging with the corresponding end of the holder cooperates with the shoulder in maintaining the sleeve against relative displacement within the holder.

4. A device of the character described, comprising a holder element of sheet material bent in the form of the letter U and having its upturned ends provided with apertures which are respectively accessible to permit insertion of a cable through aligned notches or interruptions; a split guide sleeve consisting of two counterpart sections capable, during assembling, of embracing the cable and being inserted through the apertures of the holder element; and means for securing together the two sections of the sleeve and at the same time for maintaining the sleeve assembly against displacement in the holder element.

In testimony whereof, I have hereunto signed my name at Philadelphia, Pennsylvania, this 11th day of November, 1920.

SELDON T. WILLIAMS.

Witnesses:
 JAMES H. BELL,
 E. L. FULLERTON.